Patented Nov. 4, 1947

2,430,116

UNITED STATES PATENT OFFICE 2,430,116

ALKAMINE ESTERS OF OXY SUBSTITUTED DIARYLHYDROXYACETIC ACIDS

Roger B. Holmes, South River, N. J., and Arthur J. Hill, New Haven, Conn., assignors to American Cyanamid Company, New York, N. Y., a corporation of Maine No Drawing. Application March 31, 1942, Serial No. 437,018

4 Claims. (Cl. 260—338)

This invention relates to a new class of chemical compounds, the alkamine esters of diaryl hydroxyacetic acids having a hydrocarbon radical substituted on the aryl radical through an oxygen linkage.

Alkamine esters of the diaryl hydroxyacetic acids are of very considerable commercial importance. The exact properties and consequently the uses to which they may be put depend upon the particular acid and particular aminoalcohol which go to make up the ester. The alkamine esters of the substituted diaryl hydroxyacetic acids with which the present case is concerned are active both as anti-spasmodics and as local anesthetics.

The present invention is primarily concerned with alkamine esters of substituted diaryl hydroxyacetic acids of the general formula:

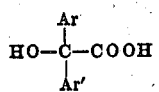

in which Ar and Ar' represent "oxy" substituted aryl radicals. In the present case the term "oxy" substituted is used to include both alkoxy substituted acids, such for example as anisilic acid in which the hydrocarbon is linked through a single oxygen and alkylideneoxy substituted acids in which the hydrocarbon is linked to the aryl radical through more than one oxygen, such for example as piperilic acid:

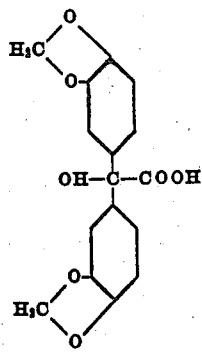

Ar and Ar' may be the same or different "oxy" substituted aryl radicals; for example both Ar and Ar' may be 4-methoxyphenyl or Ar may be 4-ethoxyphenyl and Ar' may be phenyl. More than one substitution is possible on each of the aryl radicals and the invention therefore contemplates acids having one or both of the aryl radicals being polysubstituted, as for example, hexa-methoxy benzilic acid. The invention also contemplates acids having one or more condensed nuclei such as for example 4,4-methoxynaphthilic acid.

The present invention is not limited to any particular method of producing the desired compounds. Our preferred method which produces excellent yields comprises forming an ester of the acid and a lower aliphatic alcohol, such as methyl or ethyl alcohol, and then carrying out a catalyzed ester interchange with the desired amino alcohol. This process is more fully set forth in our copending application Serial No. 431,822, filed February 21, 1942, of which the present invention is a continuation in part.

It will therefore be apparent that the principal starting material for the preparation of the compounds of this invention is a suitable acid which might be called a substituted benzilic acid. Although the invention is not limited to any particular method of producing these acids, they may be produced by a series of steps analogous to the preparation of benzilic acid from benzaldehyde. For example, anisilic acid may be produced from p-methoxy benzaldehyde by condensing it to anisoin; oxidizing the anisoin to anisil with some suitable agent such as Fehling's solution or potassium permanganate; and then treating the anisil with a strong alkali in alcoholic solution to carry out the benzilic acid rearrangement. Similarly, piperilic acid may be prepared from piperonal. These steps may be readily used to prepare any acid of symmetrical structure. Unsymmetrical acids may be similarly prepared from a suitable benzil analog. The benzil analogs may be prepared in any of several ways, as for example by oxidizing a suitable ketone or by reacting a suitable arylacetyl chloride with a suitable hydrocarbon, brominating the product and hydrolyzing the brominated product.

The present invention is generally applicable to aminoalcohols and particularly to those having a tertiary amino group. These may be represented by the formula:

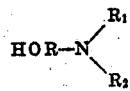

in which R is an aliphatic hydrocarbon residue and $R_1$ and $R_2$ are the same or different alkyl radicals or form with the nitrogen atom a heterocyclic ring such as the piperidine or morpholine ring. The most important aminoalcohols from a practical standpoint are those in which R is a straight saturated chain which may be represented by the formula:

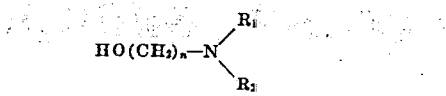

in which $n$ is a small whole number. Typical illustrations of the amino alcohols which may be used in the present invention are dimethylaminoethanol, diethylaminoethanol, dibutylaminoethanol, diethylaminopropanol, dibutylaminopropanol, dipropylaminobutanol, dibutylaminobutanol, methylethylaminopropanol, diethylaminobutanol, methylethylaminoethanol, piperdinoethanol, morpholinoethanol and the like.

The invention will be more fully illustrated in connection with the following examples, which are meant to be illustrative only and not to limit the invention. The parts are by weight unless otherwise noted.

*Example 1*

Anisilic acid

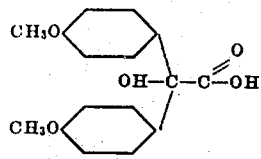

Sixty-four parts of anisil were suspended in 1800 parts of anhydrous ether in a two-liter flask to which was added a solution of 12 parts of sodium dissolved in 260 parts of absolute ethanol. The mixture was well agitated and allowed to stand for two days with occasional shaking. The sodium salt of anisilic acid was then extracted with water, the aqueous solution washed with ether and the water extract boiled for a short time to remove alcohol and ether. After cooling, the alkaline solution was acidified with dilute hydrochloric acid to precipitate the free acid which was collected and recrystallized from fifty percent ethanol.

*Example 2*

Ethyl anisilate

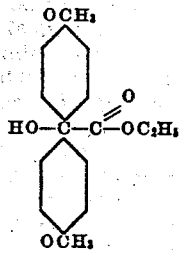

Eighty-six parts of anisilic acid were dissolved in 420 parts of absolute ethanol and to the resulting solution were added five parts of concentrated sulfuric acid. The mixture was then refluxed over a steam bath for a period of approximately ten hours. At the end of this time the major portion of the residual ethanol was removed by distillation under diminished pressure and the residue taken up in ether. This etherial solution was washed repeatedly with water, until the washings were free from acid, and subsequently dried over anhydrous sodium sulfate. The ether was removed by distillation and the residue was distilled at a pressure of 3 mm. The fraction boiling between 200° C. and 220° C. was collected and upon cooling it solidified in the receiver.

The ester was crystallized from 95% alcohol from which it separated in small, white needles that melted at 153–4° C.

*Example 3*

β-diethylaminoethyl anisilate

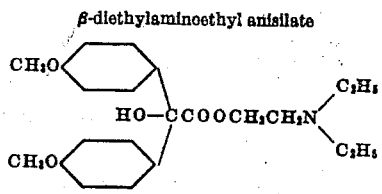

1 part of sodium was dissolved in 150 parts of β-diethylaminoethanol and added to 134 parts of ethyl anisilate. The reaction mixture was heated in an oil-bath at 150° C. for a period of 46 hours. Ethanol and excess β-diethylaminoethanol were removed by distilling until the temperature reached 170° C. The residue was dissolved in ether and washed several times with water. After drying over sodium sulfate the ether was distilled off and the residue distilled at a pressure of 3 mm. It distilled between 210° and 230° C.

*Example 4*

Hydrochloride of β-diethylaminoethyl anisilate

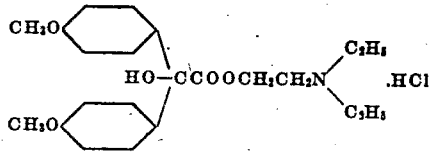

The distillate obtained in Example 3 was dissolved in anhydrous ether and the hydrochloride of the alkamine-ester was precipitated with dry hydrogen chloride in the cold. The solid was filtered off and purified by crystallization from acetone; the pure hydrochloride melted at 156–7° C.

*Example 5*

Piperilic acid

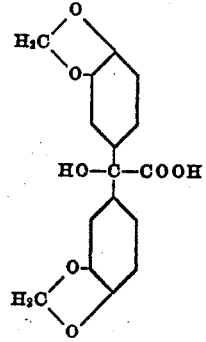

Example 1 was repeated substituting 100 parts of piperil dissolved in 2000 parts of ether and 30 g. metallic sodium dissolved in 500 parts of absolute ethyl alcohol. After standing for 24 hours the sodium salt was extracted with water and the water solution acidified with HCl which produced a black tarry precipitate. The precipitate was extracted with absolute ether and dried over anhydrous sodium sulfate. Ether was removed by distillation and the residue dissolved in dilute NaOH. The free piperilic acid was then precipitated with HCl as an oil which solidified over vacuum desiccation.

Example 6

β-Diethylaminoethylpiperilate hydrochloride

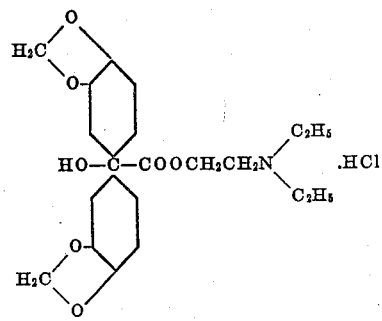

Example 3 was repeated substituting 100 parts of piperilic acid as prepared in Example 5 and the hydrochloride of the alkylene ester prepared as in Example 4.

In the examples the hydrochlorides of the alkamine esters have been described since they are both cheap and simple to prepare and the salts are much more readily soluble than the bases. However, other salts such as the hydrobromides, sulfates and the like may be readily prepared. It is also possible to make salts of the alkamine esters with strong organic acids such as the tartaric or citric acids. Or if so desired, the base may be converted into salts of weak organic or inorganic acids such as the picrates or borates. In some cases it may be desirable to form quarternary salts such as the methiodide, the ethobromide, the benzobromide or the like.

We claim:

1. Chemical compounds selected from the group consisting of the esters having the type formula Ac—R—X in which Ac represents the residue of an acid selected from the group consisting of anisilic acid and piperilic acid and —R—X represents the residue of a monohydric tertiary aminoalcohol in which R is a residue of a lower, saturated, straight-chain aliphatic hydrocarbon of from two to four carbon atoms and X is a member of the group consisting of the

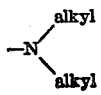

the alkyl groups being identical, each being a straight chain of from two to four carbon atoms;

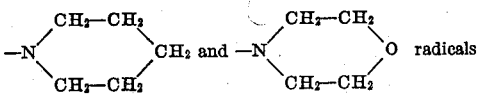

2. Chemical compounds selected from the group consisting of the esters having the type formula Ac—R—X in which Ac represents the residue of an acid selected from the group consisting of anisilic acid and piperilic acid and —R—X represents the residue of a dialkylaminoalkanol and the water-soluble salts of such esters.

3. As new chemical compounds β-diethylaminoethylanisilate and the water-soluble salts thereof.

4. As new chemical compounds β-diethylaminoethyl piperilate and the water-soluble salts thereof.

ROGER B. HOLMES.
ARTHUR J. HILL.

REFERENCES CITED

The following references are of record in the file of this patent:

UNITED STATES PATENTS

| Number | Name | Date |
|---|---|---|
| 1,932,341 | Geiggenheim | Oct. 24, 1933 |

FOREIGN PATENTS

| Number | Country | Date |
|---|---|---|
| 187,825 | Switzerland | Feb. 16, 1937 |

OTHER REFERENCES

Bachmann, Journal American Chemical Society, vol. 56 (1934), pp. 170–173.

Richter Organic Chemistry, vol. II, p. 607, Trans. from 11th German edition, Blachiston's Sons, pub.

Gilman et al., "Jour. of Pharmocology and Experimental Therapeutics," Mar. 1942, pp. 290–307.